(12) United States Patent
Saunders et al.

(10) Patent No.: US 7,858,250 B2
(45) Date of Patent: Dec. 28, 2010

(54) METHODS OF REMOVING CONTAMINANTS FROM A FUEL CELL ELECTRODE

(75) Inventors: James H. Saunders, Worthington, OH (US); Alan J. Markworth, Columbus, OH (US); Caroline M. Markworth, legal representative, Columbus, OH (US); Bradley C. Glenn, Hilliard, OH (US); Barry Hindin, Reynoldsburg, OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 12/613,637

(22) Filed: Nov. 6, 2009

(65) Prior Publication Data

US 2010/0092816 A1     Apr. 15, 2010

Related U.S. Application Data

(60) Division of application No. 10/913,287, filed on Aug. 6, 2004, now Pat. No. 7,615,294, which is a continuation-in-part of application No. PCT/US03/03865, filed on Feb. 6, 2003.

(60) Provisional application No. 60/354,713, filed on Feb. 6, 2002, provisional application No. 60/431,051, filed on Dec. 5, 2002.

(51) Int. Cl.
    *H01M 8/04* (2006.01)
(52) U.S. Cl. .................. 429/428; 429/430; 429/431; 429/432
(58) Field of Classification Search .................. 429/13, 429/428, 430–432
    See application file for complete search history.

(56) References Cited

U.S. PATENT DOCUMENTS 3,207,682 A     9/1965     Oswin et al. ............... 204/140

(Continued)

FOREIGN PATENT DOCUMENTS

DE     19710819     3/1997

(Continued)

OTHER PUBLICATIONS

Paganelli et al. "Optimal Control Theory Applied to Hybrid Fuel Cell Powered Vehicle", 15 Triennial World Congress, Barcelona, Jul. 2002, pp. 1-6.*

(Continued)

*Primary Examiner*—Gregg Cantelmo
(74) *Attorney, Agent, or Firm*—MacMillan, Sobanski & Todd, LLC

(57) ABSTRACT

A method of optimizing a waveform of an electrical current applied to an electrode of an electrochemical device that consists of at least two electrodes separaged by an electrolyte that includes the steps of: applying an electrical current to an electrode of a device; determining a waveform of the voltage or the current of the electrical current; representing the waveform by a mathematical expression or numbers taking measurements of output voltage, current or power of the device associated with the application of the electrical current; and varying the shape and frequency of the waveform to optimize the output voltage, current or power of the device and thereby determine an optimized waveform of the electrical current to be applied to the electrode of the device.

12 Claims, 13 Drawing Sheets

U.S. PATENT DOCUMENTS

| | | | |
|---|---|---|---|
| 3,436,271 A | 4/1969 | Cole et al. | 136/86 |
| 3,544,380 A | 12/1970 | Dey | 136/86 |
| 3,607,417 A | 9/1971 | McRae et al. | 136/86 |
| 3,753,780 A | 8/1973 | Fetterman | 429/23 |
| 4,053,684 A | 10/1977 | Zito, Jr. et al. | 429/15 |
| 4,420,544 A | 12/1983 | Lawson et al. | 429/13 |
| 4,440,611 A | 4/1984 | Dhar et al. | 204/147 |
| 4,497,698 A | 2/1985 | Bockris et al. | 204/129 |
| 4,501,804 A | 2/1985 | Bockris et al. | 429/111 |
| 4,722,776 A | 2/1988 | Murphy et al. | 204/242 |
| 4,734,168 A | 3/1988 | Bockris et al. | 437/141 |
| 4,741,978 A | 5/1988 | Takabayashi | 429/23 |
| 4,790,916 A | 12/1988 | Murphy et al. | 204/129 |
| 4,904,548 A | 2/1990 | Tajima | 429/22 |
| 4,910,099 A | 3/1990 | Gottesfeld | 429/13 |
| 4,959,132 A | 9/1990 | Fedkiw, Jr. | 204/101 |
| 4,995,952 A | 2/1991 | Dandapani et al. | 204/129 |
| 5,023,150 A | 6/1991 | Takabayashi | 429/22 |
| 5,223,102 A | 6/1993 | Fedkiw, Jr. et al. | 204/78 |
| 5,242,505 A | 9/1993 | Lin et al. | 136/258 |
| 5,399,245 A | 3/1995 | Fedkiw, Jr. | 204/59 |
| 5,468,574 A | 11/1995 | Ehrenberg et al. | 429/33 |
| 5,525,436 A | 6/1996 | Savinell et al. | 429/30 |
| 5,561,202 A | 10/1996 | Helmer-Metzmann et al. | 525/471 |
| 5,601,936 A | 2/1997 | Dudfield et al. | 429/13 |
| 5,677,073 A | 10/1997 | Kawatsu | 429/22 |
| 5,679,482 A | 10/1997 | Ehrenberg et al. | 429/249 |
| 5,712,052 A | 1/1998 | Kawatsu | 429/13 |
| 5,795,496 A | 8/1998 | Yen et al. | 252/62.2 |
| 5,800,798 A | 9/1998 | Ino et al. | |
| 5,925,476 A | 7/1999 | Kawatsu | 429/24 |
| 5,945,229 A | 8/1999 | Meltser | 429/13 |
| 5,965,299 A | 10/1999 | Khan et al. | 429/313 |
| 5,976,724 A | 11/1999 | Bloomfield | |
| 5,985,477 A | 11/1999 | Iwasaki et al. | 429/33 |
| 6,001,499 A | 12/1999 | Grot et al. | 429/22 |
| 6,063,516 A | 5/2000 | Grot et al. | 429/22 |
| 6,068,942 A | 5/2000 | Strasser et al. | 429/13 |
| 6,096,448 A * | 8/2000 | Wilkinson et al. | 429/443 |
| 6,096,449 A | 8/2000 | Fuglevand et al. | 429/13 |
| 6,124,060 A | 9/2000 | Akita et al. | 429/307 |
| 6,183,914 B1 | 2/2001 | Yao et al. | 429/309 |
| 6,210,820 B1 | 4/2001 | Knights et al. | 429/13 |
| 6,232,750 B1 | 5/2001 | Podrazhansky et al. | |
| 6,238,543 B1 | 5/2001 | Law, Jr. et al. | 205/415 |
| 6,245,214 B1 | 6/2001 | Rehg et al. | 205/764 |
| 6,255,008 B1 | 7/2001 | Iwase | 429/9 |
| 6,265,092 B1 | 7/2001 | Meltser et al. | 429/12 |
| 6,635,369 B2 | 10/2003 | Uribe et al. | 429/13 |
| 2001/0028967 A1 | 10/2001 | Roberts et al. | 429/13 |
| 2001/0037948 A1 | 11/2001 | Liu et al. | 205/555 |
| 2001/0038937 A1 | 11/2001 | Suzuki et al. | 429/33 |
| 2002/0075003 A1 | 6/2002 | Fridman et al. | |
| 2006/0070886 A1 | 4/2006 | Saunders et al. | |

FOREIGN PATENT DOCUMENTS

| | | |
|---|---|---|
| DE | 10053851 | 5/2002 |
| EP | 0701294 | 8/1996 |
| EP | 1017121 | 7/2000 |
| EP | 0692835 | 2/2001 |
| JP | 402311302 | 12/1990 |
| JP | 8007905 | 1/1996 |
| JP | 410216461 | 8/1998 |
| JP | 1134624 | 12/1999 |
| WO | WO 98/42038 | 3/1998 |
| WO | WO 98/52243 | 11/1998 |
| WO | WO 99/67846 | 12/1999 |
| WO | WO 01/80340 | 4/2001 |

OTHER PUBLICATIONS

Carrette et al., "Improvement of CO tolerance of proton exchange membrane (PEM) fuel cells by pulsing techinque", PCCP, vol. 3, No. 3, pp. 320-324 (2001).*

Utkin, Sliding Modes in Control and Optimization, pp. 198-205, Springer-Verlag, Berlin (1992).*

Springer et al. "Model for Polymer Electrolyte Fuel Cell Operation on Reformate Feed: Effects of CO, H2 Dilution and High FUel Utilization" J. Electrochem. Soc, vol. 148, Issue 1, pp. A11-A23 (Jan. 2001).*

International Search Report citing WO 01/80340 and DE 10053851, Oct. 2004.

International Search Report citing DE 19710819, Oct. 2003.

Park, "Direct oxidation of hydrocarbons in a solid-oxide fuel cell", Nature, vol. 404, pp. 265-267 (2000).

Wang et al., "Pulsed-Potential Oxidation of Methanol; I. Smooth Platinum Electrode With and Without Tin Surface Modification", J. Electrochem. Soc., vol. 139, No. 9, pp. 2519-2525 (1992).

Wang et al., "Pulsed-Potential Oxidation of Methanol; II. Graphite-Supported Platinum Electrode With and Without Tin Surface Modification", J. Electrochem. Soc., vol. 139, No. 11, pp. 3151-3158 (1992).

Dzwinel et al., "A Computational Model of Fuel Cell Short-Time Dynamics", Transactions, vol. 4, No. 4, pp. 299-310 (1987).

Argyropoulos et al., "Dynamic response of the direct methanol fuel cell under variable load conditions", Journal of Power Sources, vol. 87, pp. 153-161 (2000).

Koper, "The Theory of Electrochemical Instabilities", Electrochimica Acta, vol. 37, No. 10, pp. 1771-1778 (1992).

Parmananda et al., "Stabilization of unstable steady states in an electrochemical system using derivative control", Physical Review E, vol. 49, No. 6, pp. 5007-5011 (1994).

Bockris, "Basis of Possible Continuous Self Activation in an Electrochemical Energy Converter", J. Electroanal. Chem., vol. 7, pp. 487-490 (1964).

Deibert et al., "Voltage Oscillations of the H2-CO System", J. Electrochem. Soc.. vol. 116, No. 9, pp. 1290-1292 (1969).

Farooque et al., "The Anodic Oxidation of Methanol via Continuous Electrode Reactivation", Electrochimica Acta, vol. 24, pp. 547-553 (1979).

Fedkiw et al., "Pulsed-Potential Oxidation of Methanol", J. Electrochem. Soc., vol. 135, No. 10, pp. 2459-2465 (1988).

Carrette et al., "Improvement of CO Tolerance of Proton Exchange Membrane (PEM) Fuel Cells by a Pulsing Technique", PCCP, vol. 3, No. 3, pp. 320-324 (2001).

Fukumoto, "Oscillation Phenomena on the Cell Voltage of PEFCs During CO Poisoning", Electrochemistry, vol. 68, No. 10, pp. 794, 796, 798, 800 (2000).

* cited by examiner

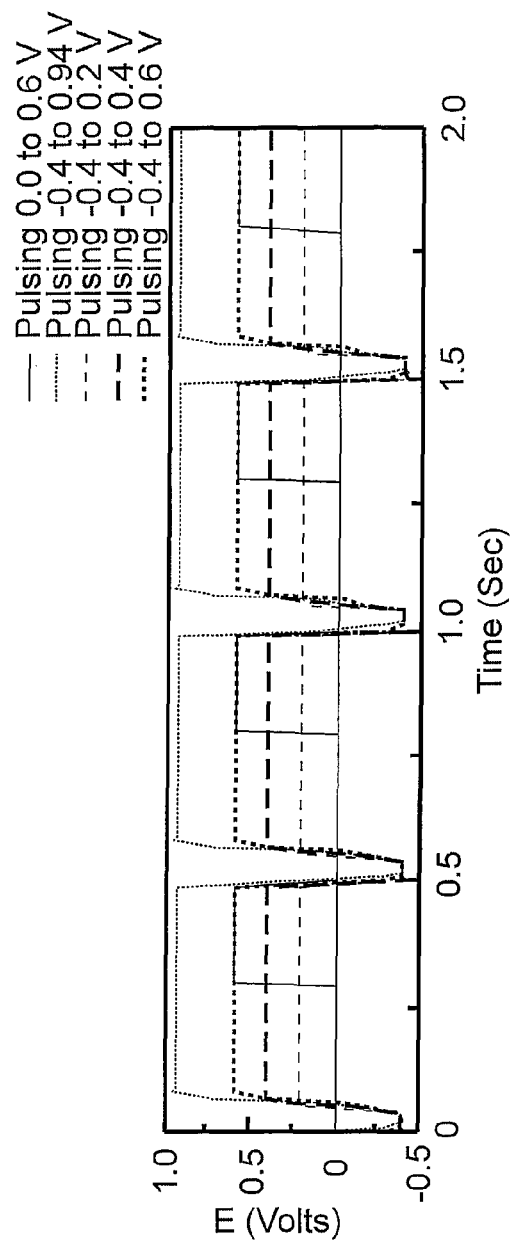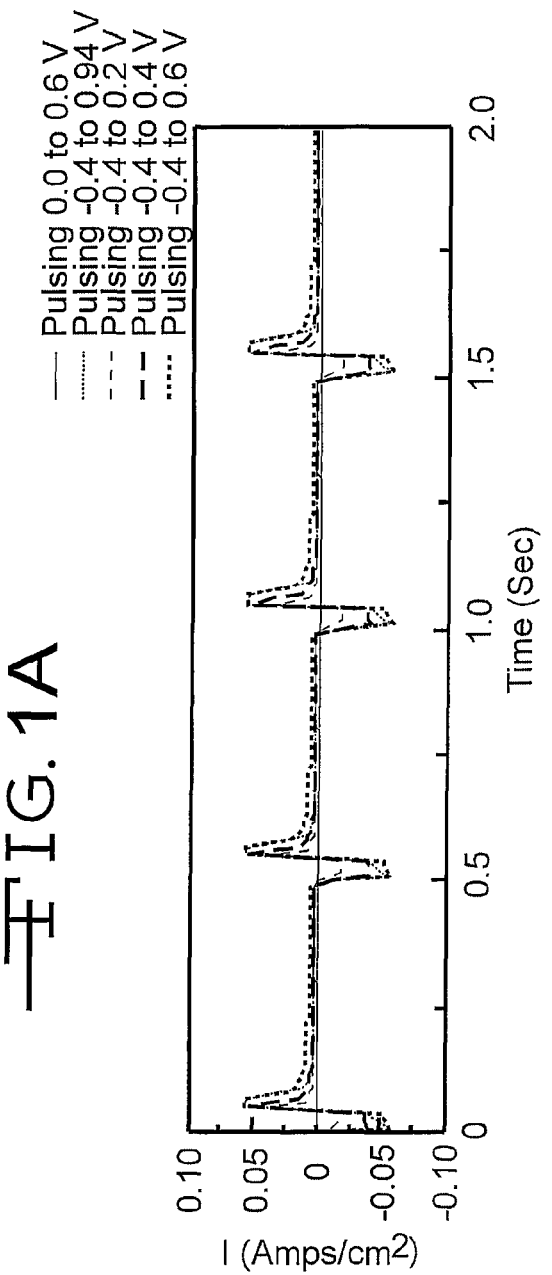

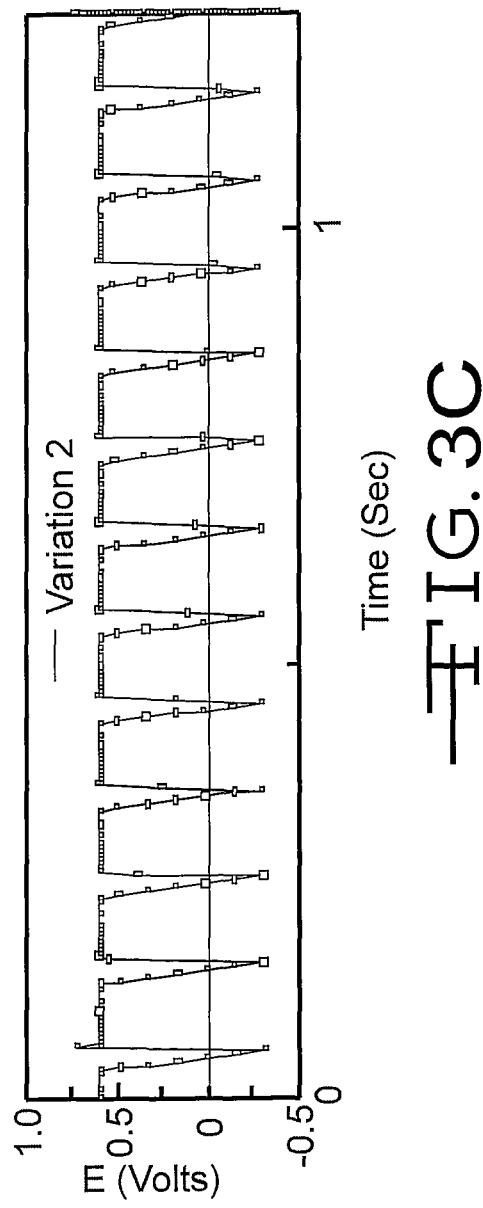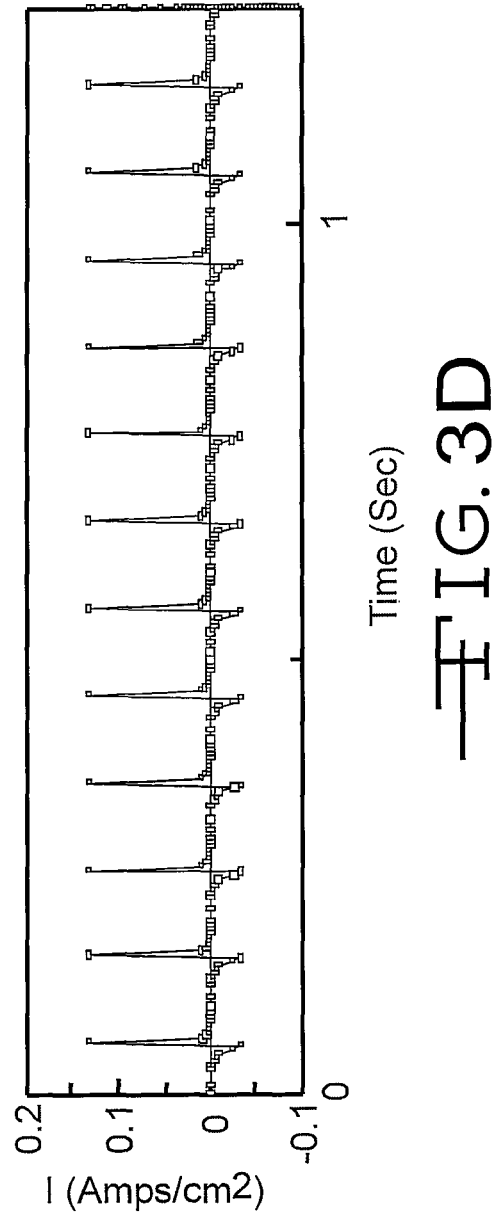

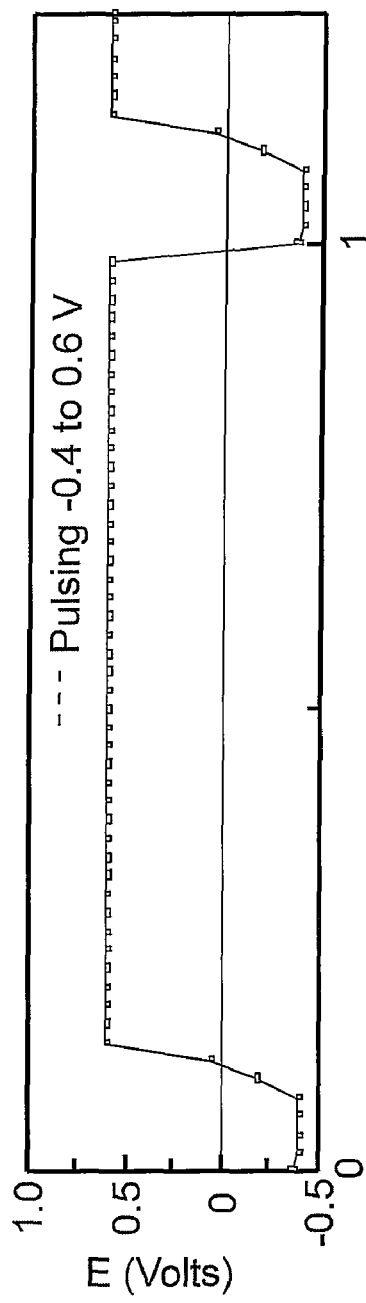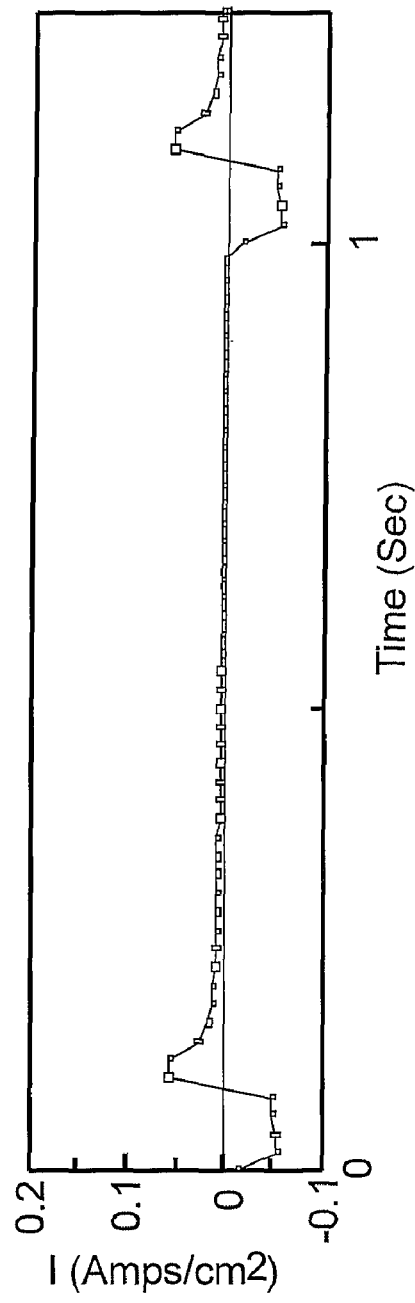

METHODS OF REMOVING CONTAMINANTS FROM A FUEL CELL ELECTRODE

CROSS-REFERENCE TO RELATED APPLICATIONS

This application is a divisional of co-pending U.S. application Ser. No. 10/913,287, filed Aug. 6, 2004, now U.S. Pat. No. 7,615,294, issued on Nov. 10, 2009, which is a continuation-in-part of co-pending International Patent Application No. PCT/US03/03865 filed Feb. 6, 2003 that claims priority to U.S. Patent Application No. 60/354,713, filed Feb. 6, 2002, and U.S. Patent Application No. 60/431,051, filed Dec. 5, 2002. International Patent Application No. PCT/US03/03865 was published as WO 03/067696 on Aug. 14, 2003 in English under PCT Article 21(2)

TECHNICAL FIELD

This invention relates in general to methods of removing contaminants such as carbon monoxide from an anode or cathode of a fuel cell.

BACKGROUND OF THE INVENTION

Fuel cells and particularly polymer electrolyte membrane ("PEM") fuel cells are actively under development by a large number of companies. These devices, while offering efficiency and environmental advantages, are too expensive at current prices to have a major market impact. Consequently, there is a world-wide effort to reduce the cost of these units.

Fuel cells for stationary applications are fueled primarily by methane and propane, from which hydrogen is obtained in a fuel processing unit that combines steam reforming with water-gas shifting and carbon monoxide cleanup. It is widely recognized that even 50 ppm of carbon monoxide (CO) in the fuel can coat the anode of the fuel cell, reducing the area available for hydrogen to react, and limiting the fuel cell current. CO is also a major poison with reformed methanol and direct methanol fuel cells.

Reforming methane produces about 10% or higher CO. This is reduced to about 1 percent CO in a water-gas shift reactor, followed by a reduction to 10 to 50 ppm in a CO clean-up reactor. Both the water-gas shift reactor and the clean-up reactor are major costs in the fuel cell system. For instance, in one approach, the PROX clean-up reactor uses two to three reaction stages operating at temperature of 160° C. to 190° C. compared to the stack temperature of 80° C. The water-gas shift reactor typically consists of two reactor stages operating at higher and lower temperatures. In addition, a stack running on 10 to 50 ppm of CO must be about twice the electrode area of a stack operating on pure $H_2$.

Cleaning an anode of an electrochemical energy converter by changing the potential of the anode was proposed by Bockris in "Basis of Possible Continuous Self Activation In an Electrochemical Energy Converter", J. Electroanal. Chem., vol. 7, pp. 487-490 (1964). In his scheme, a cleaning current pulse of about 40 mA was used. During the time the pulse was on, cleaning was accomplished but little or no power was produced. When the pulse was off, power was produced using the cleaned electrode, which gradually became re-covered with CO. Consequently, this system is most attractive when the cleaning pulses are of short duration in the duty cycle. The cleaning pulses may consume energy, so the power produced must be larger than the power consumed by the cleaning pulses for a net gain in power to be realized.

Publications using and extending this approach have appeared, including International Publication No. WO 98/42038 by Stimming et al. applying this technology to PEM fuel cells, and Carrette, Friedrich, Huber and Stimming, "Improvement of CO Tolerance of Proton Exchange Membrane Fuel Cells by a Pulsing Technique", PCCP, v. 3, n. 3, Feb. 7, 2001, pp 320-324. The Stimming approach also used a cleaning current pulse of between 100 and 640 $mA/cm^2$ with varying pulse durations and frequencies. Square wave current pulses, similar to the work of Bockris, are used. In addition, Stimming has proposed using positive voltage pulses for cleaning. Stimming showed that this method could clean electrodes with 1 percent CO in the feed stream for laboratory, bench-top experiments.

Wang and Fedkiw, "Pulsed-Potential Oxidation of Methanol, I", J. Electrochem. Soc., v. 139 n. 9, September 1992, 2519-2525, and "Pulsed-Potential Oxidation of Methanol, II", v. 139, n. 11, 3151-3158, showed that pulsing a direct methanol fuel cell with positive square wave pulses of a certain frequency could result in a substantial increase in output current. The increase was attributed to cleaning intermediates from the electrode.

The pulsing approaches used in the current patent and technical literature do not address pulsing waveform shapes other than square waves. In addition, methods of determining suitable waveform shapes for different electrodes, electrolytes, load characteristics, and operating conditions are not discussed. More powerful techniques are needed for electrode cleaning in fuel cells, particularly techniques that would allow the fuel cell to consistently and robustly operate on 1 percent and higher levels of CO, while eliminating the clean-up reactor, simplifying the reformer and shift reactors, and reducing the stack size. The invention reported herein utilizes the inherent dynamical properties of the electrode to improve the fuel cell performance and arrive at a suitable pulsing waveform shape or electrode voltage control method.

Furthermore, the literature to date that is known to us is restricted to CO levels less than 1 percent. The invention reported herein allows operation at higher levels of CO, which enables the reformer to be substantially simplified.

SUMMARY OF THE INVENTION

This invention relates to a method of optimizing a waveform of an electrical current applied to an electrode. The method includes the steps of: applying an electrical current to an electrode of a device; determining a waveform of the voltage or the current of the electrical current; representing the waveform by mathematical expressions or numbers; measuring a function of the device associated with the application of the electrical current; and varying the shape and frequency of the waveform to optimize the function of the device and thereby determine an optimized waveform of the electrical current to be applied to the electrode of the device.

The invention also relates to another method of optimizing a waveform of an electrical current applied to an electrode. The method includes the steps of: applying an electrical current to an electrode of a device; determining a waveform of the voltage or the current of the electrical current; representing the waveform by a mathematical description such as a number of points or an analytical function characterized by a number of unknown coefficients and a fixed number of known functions; measuring a function of the device associated with the application of the electrical current; feeding the waveform description and the measurements to an algorithm, which may be in a computer program or other calculating device including manual calculations, including an optimization routine which uses the points or coefficients as independent variables for optimizing the function of the device; and performing the calculations to determine values of the points or coefficients which optimize the function of the device, and thereby determine an optimized waveform of the electrical current to be applied to the electrode of the device.

The invention also relates to a method of removing contaminants from an anode of a fuel cell. The method includes the steps of: applying an electrical current to the anode of the fuel cell; and pulsing the voltage of the electrical current during the application, such that the overvoltage at the anode is negative during the pulses, and the overvoltage at the anode is positive between the pulses.

The invention also relates to a method of operating a fuel cell. The method includes the steps of: applying an overvoltage to the anode of the fuel cell by applying a voltage to the anode with respect to a reference electrode, where the fuel contains higher than 1 percent CO; and varying the overvoltage between a low value normally used for power production and a high value sufficiently high for cleaning CO from the electrode.

The invention also relates to another method of operating a fuel cell. The method includes the steps of: feeding a fuel to the fuel cell containing at least 1 percent of an electrochemically active contaminant; and applying an overvoltage to an electrode of the fuel cell, and varying the overvoltage between a low value normally used for power production and a high value for cleaning the contaminant from the electrode.

The invention also relates to a pulsed anode of an electrical device operating at greater than 1 percent CO using a method of optimizing a waveform of an electrical current applied to the anode. The method includes the steps of: applying an electrical current to the anode; determining a waveform of the voltage or the current of the device; representing the waveform by mathematical expressions or numbers; taking measurements of a function of the device associated with the application of the electrical current; and varying the shape and frequency of the waveform to optimize the function of the device and thereby determine an optimized waveform of the electrical current to be applied to the anode of the device.

The invention also relates to a fuel cell having a pulsed electrode including an oxidation pulse, and the fuel cell having a voltage booster to change the cell voltage during the oxidation pulse to a desired level.

The invention also relates to a fuel cell system comprising: a fuel cell operated using the method of optimizing a waveform; and a simplified fuel processor comprising a fuel reformer, and no water-gas shift reactor and no CO cleanup reactor.

The invention also relates to fuel cell system comprising: a fuel cell operated using the method of removing contaminants from an anode of a fuel cell; and a simplified fuel processor comprising a fuel reformer, and no water-gas shift reactor and no CO cleanup reactor.

The invention also relates to another fuel cell system comprising: a fuel cell having a pulsed electrode and operating with a fuel containing greater than 1 percent electrochemically active contaminant; and a fuel processor that is simplified compared to a fuel processor required when the same fuel cell is used without pulsing.

The invention also relates to a method of operating a fuel cell where a contaminant is cleaned from an electrode, where the fuel cell during operation has a variation in anode and/or cathode overvoltage. The method comprises feeding back a portion of the current output of the fuel cell to a control circuit to vary the voltage waveform to maintain a desired current and cleaning the contaminant.

The invention also relates to a method of cleaning an electrochemically active contaminant from an electrode of an apparatus used in an electrochemical process, in which the electrode is cleaned by oxidizing the contaminant so that another reaction can proceed on the electrode, where the apparatus during operation has a variation in electrode overvoltage. The method comprises feeding back a portion of the current output of the apparatus to vary the voltage waveform to maintain a desired current and cleaning the contaminant.

The invention also relates to a method of cleaning an electrochemically active contaminant from an electrode of an apparatus used in an electrochemical process, in which the electrode is cleaned by oxidizing the contaminant so that another reaction can proceed on the electrode, where the apparatus during operation has a variation in electrode overvoltage. The method comprises measuring the current or voltage across the anode and cathode of the device, and utilizing that measurement as the input to a device to vary a load impedance that is in parallel or series with the useful load of the device to vary the voltage or current waveform at the electrodes to maintain a desired current and cleaning the contaminant.

The invention also relates to a method of removing contaminants from an electrode of a fuel cell, comprising applying an electrical energy to the electrode of the fuel cell in the form of small voltage pulses to excite natural oscillations in fuel cell voltage during operation of the fuel cell, the voltage pulses being applied at the same frequency as the natural oscillations or at a frequency different from the natural oscillations.

The invention also relates to a method of removing contaminants from an anode of a fuel cell, comprising applying an electrical current to the anode of the fuel cell in the form of small voltage pulses to excite natural oscillations in fuel cell voltage during operation of the fuel cell, the voltage pulses being applied at the same frequency as the natural oscillations or at a frequency different from the natural oscillations.

The invention also relates to a method of removing contaminants from an anode or cathode of a fuel cell, comprising: applying an electrical current to the anode or cathode of the fuel cell; pulsing the voltage of the electrical current during the application; and controlling the pulsing with a control function to create a waveform or a frequency of the pulsing that removes the contaminants and maximizes the power output from the fuel cell.

The invention also relates to a method of removing contaminants from an anode or cathode of a fuel cell, comprising: applying an electrical current to the anode or cathode of the fuel cell; and pulsing the voltage of the electrical current during the application, the pulsing exciting and maintaining a natural oscillation of the fuel cell system.

The invention also relates to a feedback control method of operating a fuel cell comprising applying voltage control to an anode of the fuel cell using the following algorithm:

a) determining a mathematical model that relates the instantaneous coverage of hydrogen and carbon monoxide to the overvoltage applied to the anode;

b) forming an observer that relates the instantaneous coverage of the hydrogen and carbon monoxide to the measured current of the fuel cell;

c) driving the estimated carbon monoxide coverage to a low value by varying the overvoltage;

d) driving the estimated hydrogen coverage to a high value by varying the overvoltage; and e) repeating steps a) through d) as necessary.

The invention also relates to a feedback control method of operating a fuel cell comprising applying voltage control to an anode of the fuel cell using the following algorithm:

a) determining a mathematical model that relates the instantaneous coverage of hydrogen and carbon monoxide to the overvoltage applied to the anode;

b) forming an observer that relates the instantaneous coverage of the hydrogen and carbon monoxide to the measured current of the fuel cell;

c) prescribing a desired trajectory of the instantaneous coverage of the hydrogen and carbon monoxide as a function of time;

d) forming a set of mathematical relationships from steps a), b) and c) that allows the current to be measured, the overvoltage to be prescribed and the instantaneous carbon monoxide coverage and instantaneous hydrogen coverage to be predicted;

e) driving the carbon monoxide coverage to a low value by varying the overvoltage according to step d);

f) driving the hydrogen coverage to a high value by varying the overvoltage according to step d); and g) repeating steps a) through f) as necessary.

The invention also relates to a feedback control method of operating an electrochemical apparatus operated using a fuel containing an electrochemically active contaminant, the method comprising applying voltage control to an anode of the apparatus using the following algorithm:

a) determining a mathematical model that relates the instantaneous coverage of fuel and contaminant to the overvoltage applied to the anode;

b) forming an observer that relates the instantaneous coverage of the fuel and contaminant to the measured current of the apparatus;

c) driving the estimated contaminant coverage to a low value by varying the overvoltage;

d) driving the estimated fuel coverage to a high value by varying the overvoltage; and e) repeating steps a) through d) as necessary.

The invention further relates to a feedback control method of operating an electrochemical apparatus operated using a fuel containing an electrochemically active contaminant, the method comprising applying voltage control to an anode of the apparatus using the following algorithm:

a) determining a mathematical model that relates the instantaneous coverage of fuel and contaminant to the overvoltage applied to the anode;

b) forming an observer that relates the instantaneous coverage of the fuel and contaminant to the measured current of the apparatus;

c) prescribing a desired trajectory of the instantaneous coverage of the fuel and contaminant as a function of time;

d) forming a set of mathematical relationships from steps a), b) and c) that allows the current to be measured, the overvoltage to be prescribed and the instantaneous contaminant coverage and instantaneous fuel coverage to be predicted;

e) driving the contaminant coverage to a low value by varying the overvoltage according to step d);

f) driving the fuel coverage to a high value by varying the overvoltage according to step d); and g) repeating steps a) through f) as necessary.

Various advantages of this invention will become apparent to those skilled in the art from the following detailed description of the preferred embodiment, when read in light of the accompanying drawings.

BRIEF DESCRIPTION OF THE DRAWINGS

FIG. 1A shows voltage waveforms for a methanol fuel cell, showing that negative pulsing delivers the most current.

FIG. 1B shows current waveforms for a methanol fuel cell, showing that negative pulsing delivers the most current.

FIGS. 3C and 3D show another voltage waveform and the resulting current for the methanol fuel cell.

FIGS. 3E and 3F show another voltage waveform and the resulting current for the methanol fuel cell.

DETAILED DESCRIPTION OF PREFERRED EMBODIMENTS OF THE INVENTION

Figure 2:
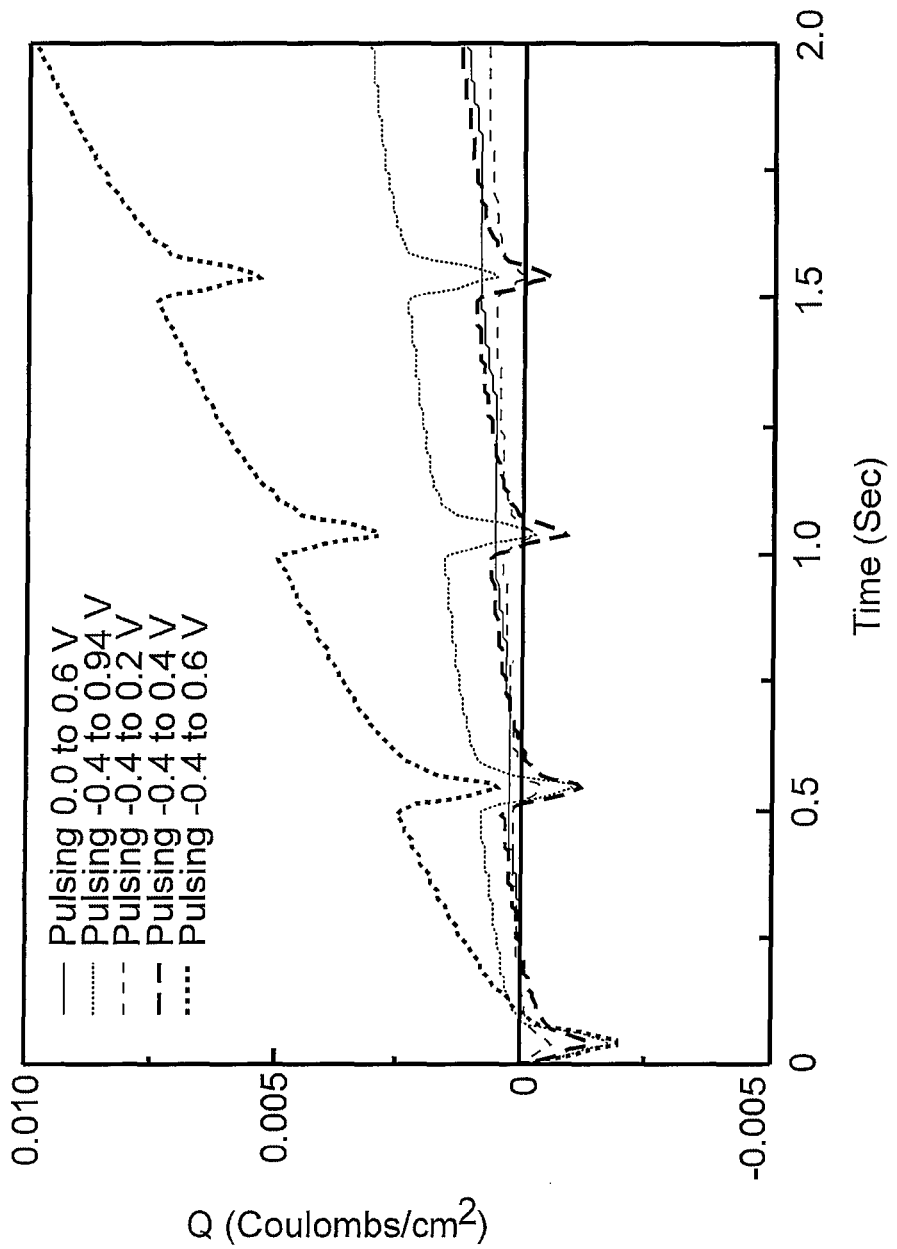
FIG. 2 shows the charge delivered by the methanol fuel cell during the experiments.
Figure 3A:
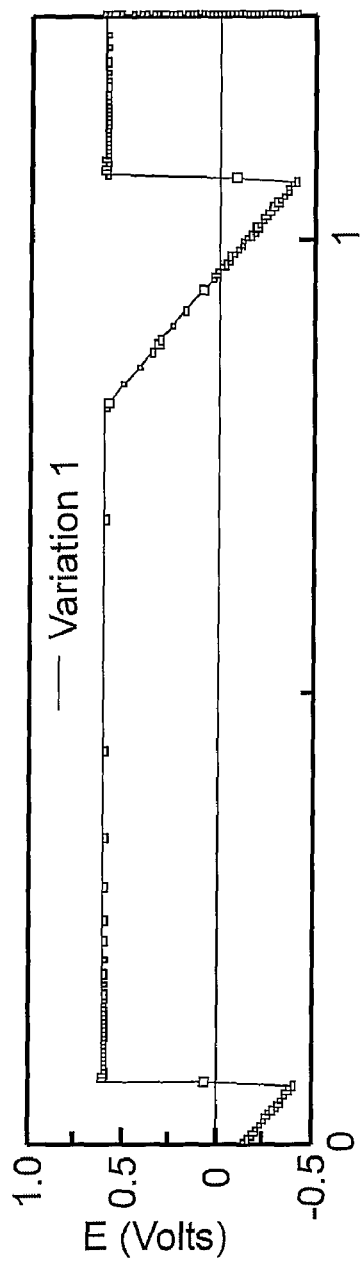
FIGS. 3A and 3B show a voltage waveform and the resulting current for the methanol fuel cell.
Figure 3B:
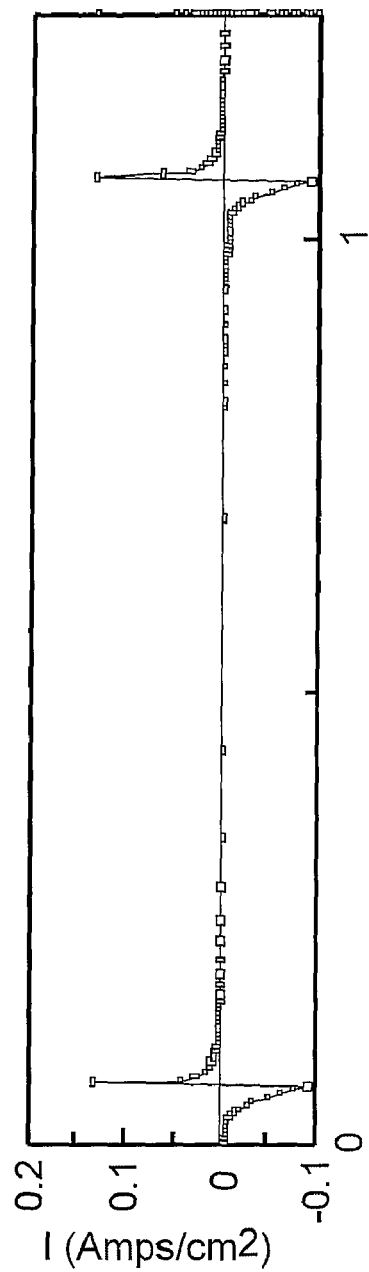

Methods of Removing Electrochemically Active Contaminants from Electrochemical Processes The present invention relates in general to methods of removing electrochemically active contaminants from electrochemical processes. The methods may apply to any electrochemical process in which a contaminant is being oxidized so that another reaction can proceed. The electrochemically active contaminant is any contaminant that can be removed by setting the operating voltage at a voltage bounded by $-V_{oc}$ and $+V_{oc}$, where $V_{oc}$ is the open circuit voltage of the apparatus used in the process. In some particular embodiments, the invention relates to methods of removing carbon monoxide or other contaminants from the anode or cathode of a fuel cell, thereby maximizing or otherwise optimizing a performance measure such as the power output or current of the fuel cell.

The methods usually involve varying the overvoltage of an electrode, which is the excess electrode voltage required over the ideal electrode voltage. This can be done by varying the load on the device, i.e., by placing a second load that varies in time in parallel with the primary load, or by using a feedback system that connects to the anode, the cathode and a reference electrode. A feedback system that is commonly used is the potentiostat. In some cases the reference electrode can be the cathode; in other cases it is a third electrode.

Broadly, the different methods involve the following concepts:

1. Obtaining useful power during the cleaning pulse of a pulsed cleaning operation used to remove contaminants from an electrochemical apparatus, for example, to remove CO from a fuel cell electrode. This enables (1) operation of a fuel cell at high CO levels, (2) a simplified fuel cell system with a reformer that produces CO at up to 10% instead of the usual 50 ppm or so, and (3) a fuel cell operating at nearly constant voltage with high current output, using a voltage booster that operates during the cleaning pulse.
2. Control of the voltage waveform during a cleaning operation to minimize the magnitude or duration of the cleaning voltage, maximize performance, and/or to satisfy some other system constraint, such as following the load or avoiding voltage and current conditions that adversely affect reliability of the electrode or apparatus.
3. A feedback control technique based on a natural oscillation in electrochemical system voltage to maintain a desired current, load profile, or to maximize performance by cleaning contaminants.

Improved Waveform for Pulsing a Fuel Cell Anode or Cathode to Maximize the Current or Power Produced, and General Method for Optimizing the Pulsing Waveform Applied to any Electrode In two preferred embodiments, the present invention provides:

An improved waveform for pulsing a direct methanol fuel cell, where the anode potential is made negative with respect to the cathode, followed by the usual power production potential which was about 0.6 volts relative to SCE in our half cell experiments.

A general method for optimizing the cleaning waveform that can be applicable to any type of electrode, and may have applications well beyond fuel cells in areas such as battery charging, electrode sensors, analytical chemistry, and material manufacturing.

Experiments were performed with a standard three electrode cell containing 1.0 M methanol and 0.5 M sulfuric acid. The anode was platinum and the cathode was a saturated calumel electrode ("SCE"). This was a batch system with the fuel (methanol) mixed with the electrolyte (sulfuric acid) in the cell. The anode voltage was controlled by a potentiostat with a voltage waveform that could be generated either by the potentiostat directly or by externally triggering the potentiostat with a programmable function generator. The resulting data, shown in FIGS. 1A and 1B for five different experiments, show that the current output is larger and substantial when the waveform is made negative (relative to the cathode) during a short cleaning pulse. FIG. 2 illustrates this better, showing that the charge delivered is larger when the cleaning pulse is negative and the voltage level during power production is at 0.6 volts (the top curve—dashed), which is near the peak methanol oxidation potential from a cyclic voltammogram. For comparison the solid black curve has a cleaning potential at 0.0 volts and power production at 0.6 volts. Notice that the current traces have a positive and a negative component to them. When the current is positive, the cell is delivering current. When the current is negative, the cell is receiving current. Consequently, it is desirable to maximize the positive current and minimize the negative current.

Figure 4:
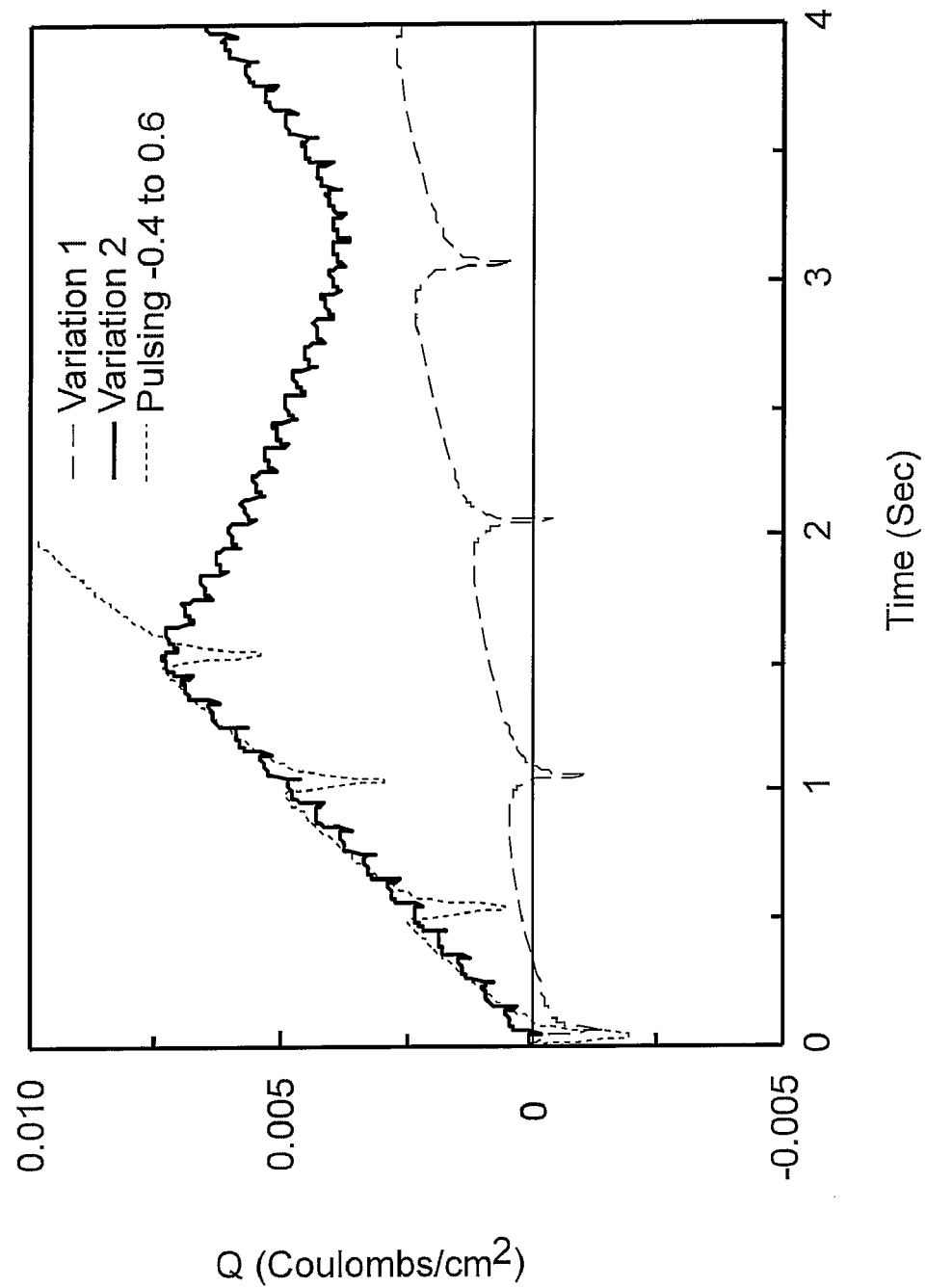
FIG. 4 shows the charge delivered by the various waveform shapes in FIGS. 3A, 3C and 3E.

To influence the positive and negative currents, we varied the shape of the voltage pulses. FIGS. 3A-3F show that varying the voltage shapes can strongly influence the shape of the current traces and can reduce the negative current. FIG. 4 illustrates the charge delivered by the various waveform shapes shown in FIGS. 3A, 3C and 3E.

The results of these experiments indicate that the waveform can be optimized by a systematic, computational procedure in order to deliver substantially more power than existing fuel cells. The experiments show that varying the waveform can significantly vary the current output.

Figure 5:
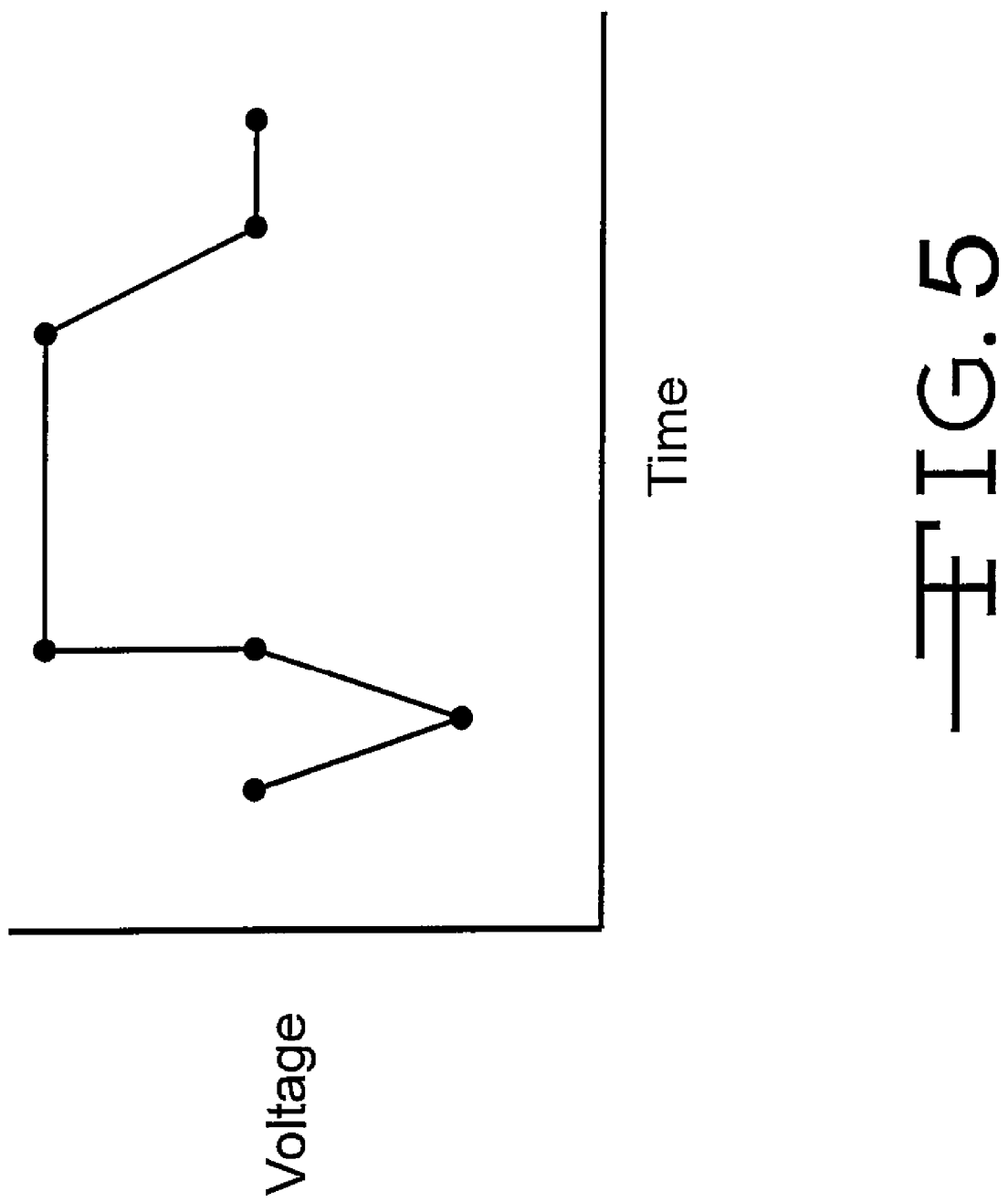
FIG. 5 is a representation of a voltage waveform by a fixed number of points.

To illustrate the method, consider a waveform to be represented by a fixed number of points, as shown in FIG. 5. The number of points is arbitrary, but the more points, the longer the optimization time that is required. The waveform is a voltage or current waveform that is connected to the anode of a fuel cell, such that the anode is operated at that voltage, or perhaps is operated at that voltage plus or minus a fixed offset voltage. The offset voltage may vary slowly with the operating conditions due to, for instance, changes in the load. The waveform variation is much faster than any variation in the offset voltage.

This waveform pattern is fed to the anode and repeated at a frequency specified by the points, as the figure illustrates. Measurements are made of the power or current or other performance parameter, whichever is most appropriate, delivered by the fuel cell. The performance parameter and waveform points are then fed to an algorithm, which may be in a computer program or hand calculation, which optimizes the waveform shape to maximize the performance, such as power or current delivered.

The optimum waveform can thus be determined for the specific fuel cell electrode and operating conditions. This optimizing procedure can be repeated as often as necessary during operation to guard against changes in the electrode or other components over time or for different operating conditions.

Mathematically, the points describing the waveform can be considered to be independent variables for the optimization routine. The net current or power produced (current or power that is output minus any current or power supplied to the electrode) is the objective function to be optimized. A person skilled in the art of optimization could select a computer algorithm to perform the optimization. Typical algorithms might include steepest descent, derivative-free algorithms, annealing algorithms, or many others well-known to those skilled in the art.

Alternatively, the waveform could be represented by a set of functions containing one or more unknown coefficients. These coefficients are then analogous to the points in the preceding description, and may be treated as independent variables in the optimization routine. As an example, the waveform could be represented by a Fourier Series, with the coefficient of each term in the series being an unknown coefficient.

Obtaining Useful Power During the Cleaning Pulse of a Pulsed Cleaning Operation Used to Remove Contaminants from an Electrochemical Apparatus Pulsed cleaning of electrochemically active contaminants from an electrode of an electrochemical apparatus involves raising the overvoltage of the electrode to a sufficiently high value to oxidize the contaminants adsorbed onto the electrode surface. For example, the pulsed cleaning of an anode or cathode of a fuel cell usually involves raising the overvoltage to oxidize adsorbed CO to $CO_2$. When a sufficient amount of time has elapsed, the overvoltage is dropped back to the conventional overvoltage where power is produced.

Figure 6:
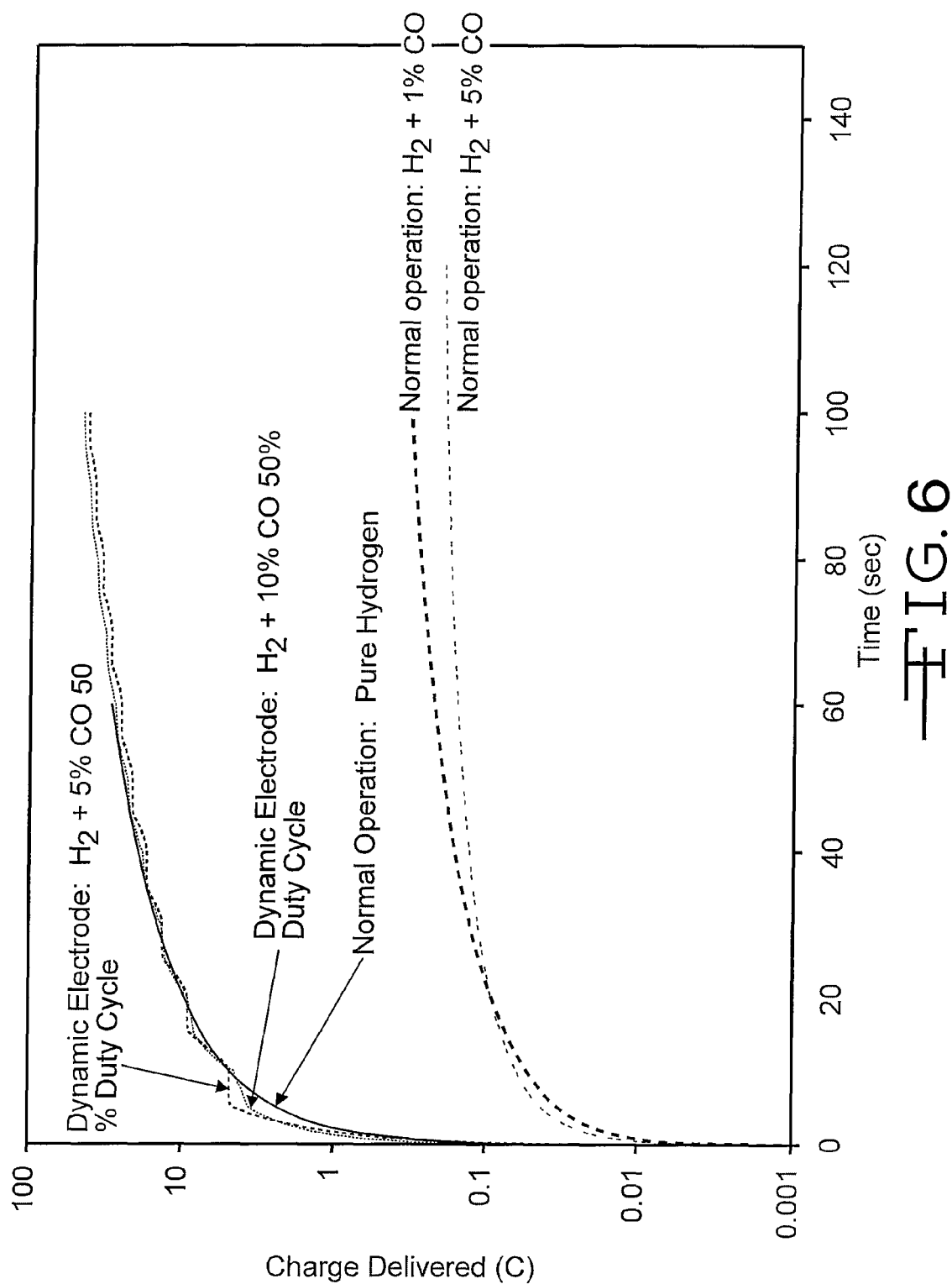
FIG. 6 shows a comparison of the charge delivered by a dynamic electrode with hydrogen fuel and different levels of carbon monoxide, compared to normal fuel cell operation.

Conventional thinking is that little or no useful power is generated during the cleaning pulse. However, our work with pulsing of a fuel cell anode has surprisingly shown that high current can be obtained during the cleaning pulse. Also surprisingly, our work has shown that when the hydrogen fuel contains high levels of CO, up to 10 percent, currents can be obtained approaching that obtained when pure hydrogen is used as the fuel. FIG. 6 shows a plot of charge delivered by a 5 cm² PEM fuel cell, operated as a single cell at room temperature under a standard three-electrode configuration with a potentiostat and air supplied to the cathode, as a function of time. The smooth curve at the top is the charge obtained when pure hydrogen is used as the fuel. Without pulsing, when 1 percent CO is added to the hydrogen, the charge drops by more than two orders of magnitude. Similar performance is seen with 5 percent CO. However, when the fuel cell anode is pulsed, the charge increases, and particular combinations of pulse width and frequency result in increased charge. At 5 and 10 percent CO, the figure shows data that reveal that the cell charge is nearly the same as the cell charge when the fuel is pure hydrogen.

Thus, we have discovered that pulsing of a fuel cell anode allows the fuel cell to operate using a hydrogen fuel containing greater than 1% CO, up to 10% CO or possibly higher. Pulsing can take care of much larger amounts of CO than previously thought. In the past, most fuel cells have been operated using a hydrogen fuel containing 50 to 100 ppm, whereas we have found that up to 10% or more CO can be used (at least 10,000 times the previous level). This invention permits a step change increase in CO contamination with minimal impact on current output.

Advantageously, the ability to operate a fuel cell with hydrogen having high CO levels enables a simplified, less costly fuel cell system to be used. Operation at high CO levels enables the fuel processor to be much simpler, less costly and smaller in size. The fuel processor of a conventional fuel cell system usually includes a fuel reformer, a multi-stage water-gas shift reactor and a CO cleanup reactor. The simplified fuel processor of the invention can include a fuel reformer and a simplified water-gas shift reactor, for example a one-stage or two-stage reactor instead of a multi-stage reactor. In some cases, the water-gas shift reactor can be eliminated. The cleanup reactor can usually be eliminated in the simplified fuel processor. Essentially this invention enables the fuel cell electrode to tolerate CO concentrations of 10 percent or higher, and therefore the fuel processor can operate with simplified components since it can produce CO concentrations of 10 percent or higher.

Figure 7A:
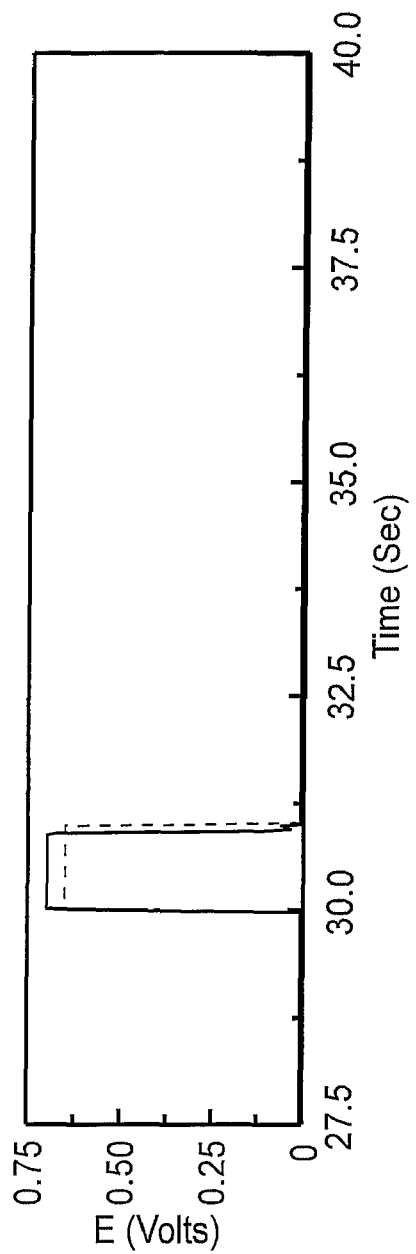
FIG. 7A shows voltage waveforms of a fuel cell using hydrogen containing 1% CO as the fuel.
Figure 7B:
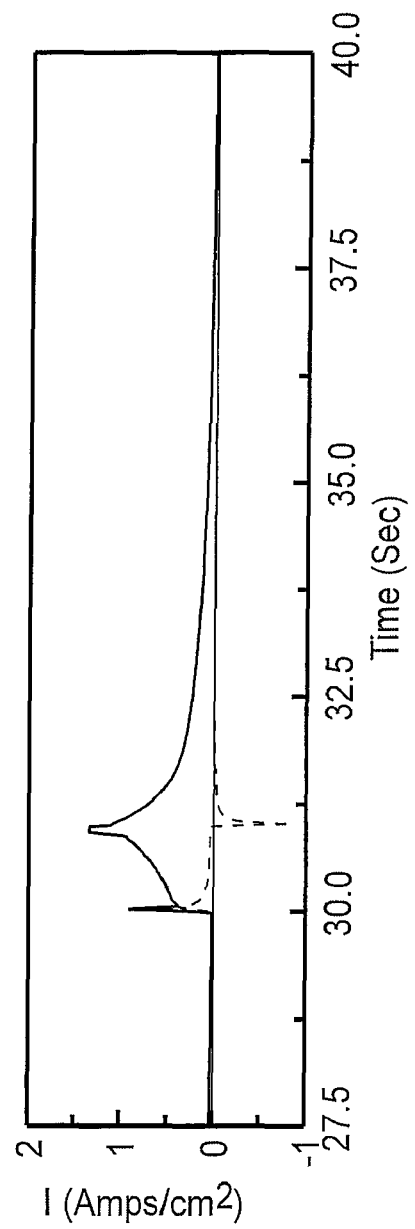
FIG. 7B shows the current resulting from the voltage waveforms of FIG. 7A.

An examination of the cell voltage and current is shown in FIGS. 7A and 7B for 1% CO in hydrogen in the same fuel cell and same operating conditions as that in FIG. 6. Two cases are shown. In the first, the overvoltage waveform varies between 0.05 and 0.7 volts. In the second, the overvoltage varies between 0.05 and 0.65 volts. The figure shows that the cell current is high when the voltage reaches 0.7 volts, but is much lower when the voltage reaches 0.65 volts. This indicates that 0.7 volts is the CO oxidizing voltage, in agreement with known theory. The initial peak in current, when the voltage first reaches 0.7 volts, is expected to be the CO being oxidized. The current then decreases and then increases steadily as the hydrogen reaches the newly cleaned surface. The hydrogen current is high at this large overvoltage.

Figure 8:
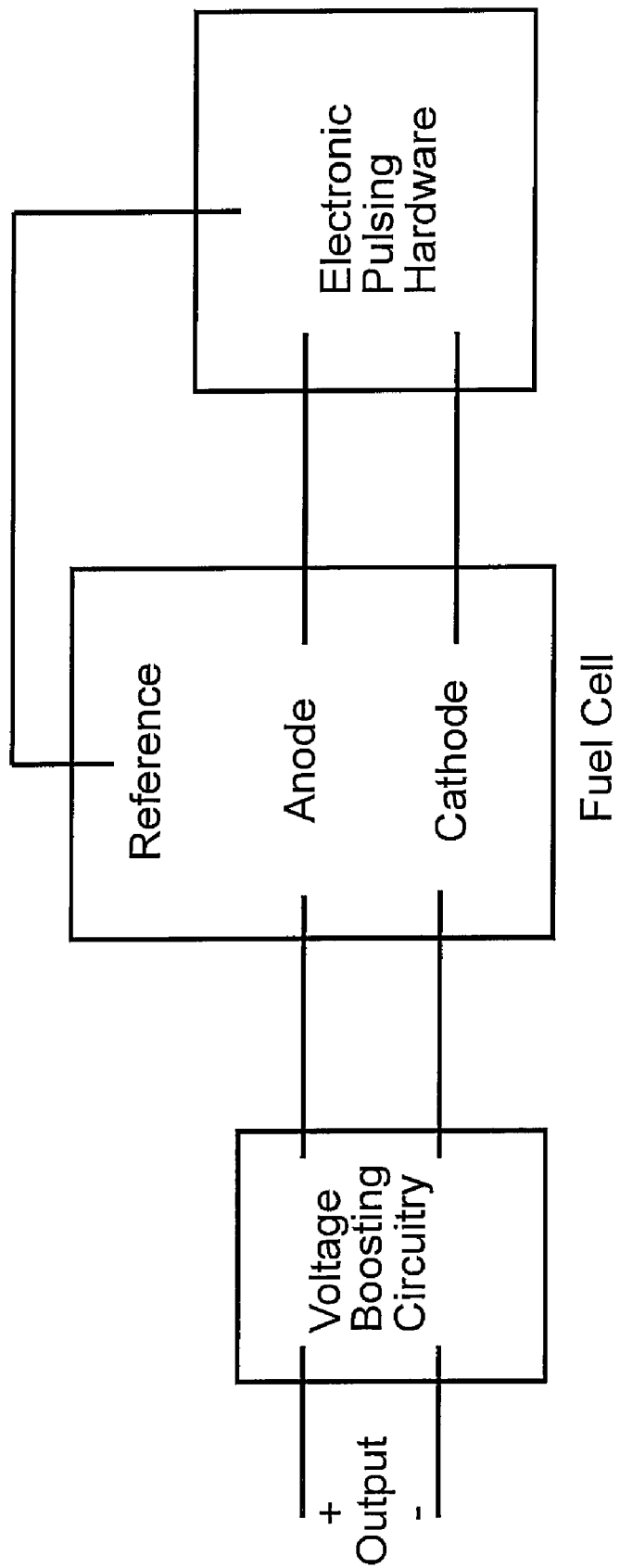
FIG. 8 is a schematic of a device including a fuel cell, electronic pulsing hardware and voltage boosting circuitry.
Figure 9:
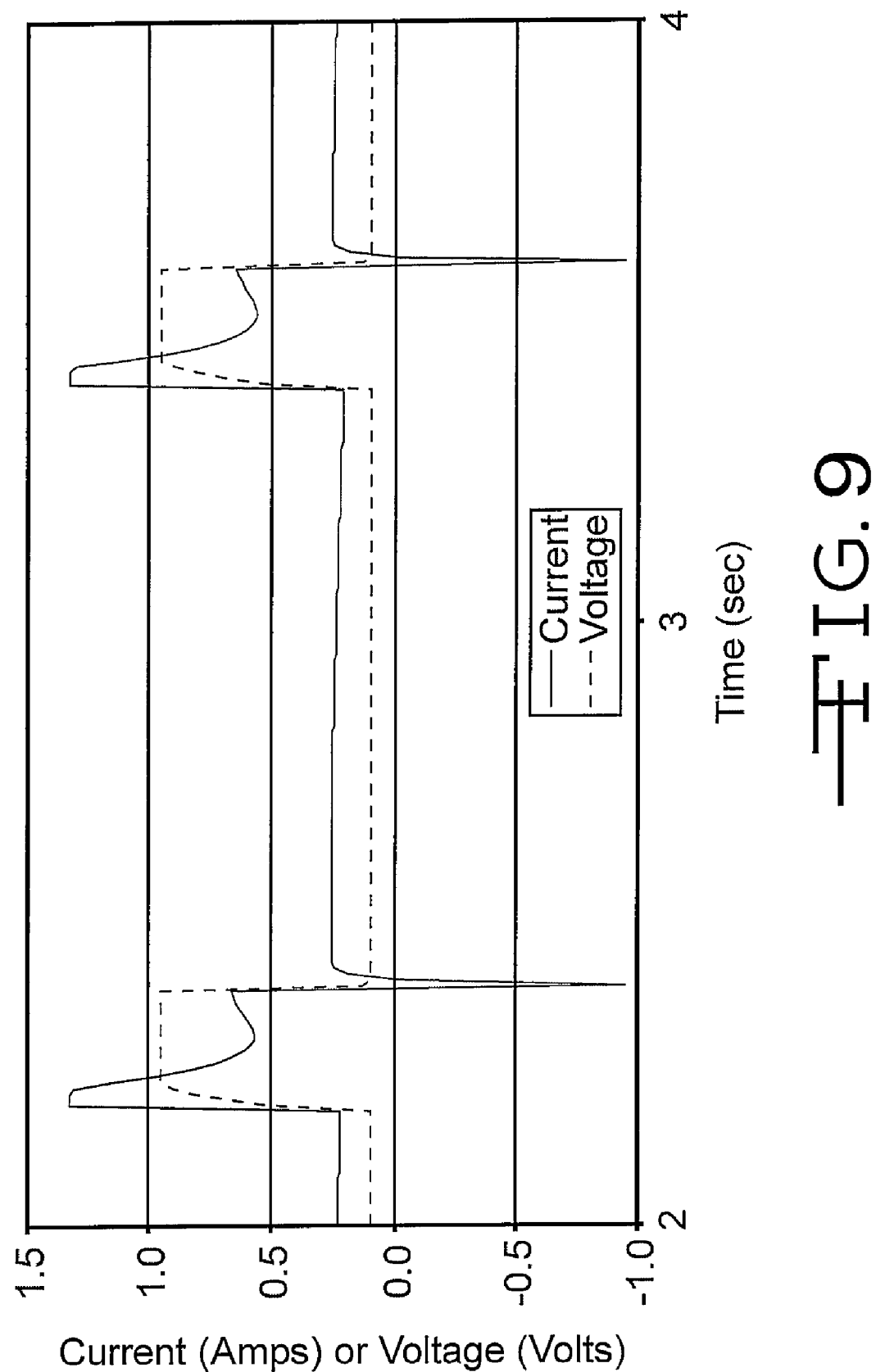
FIG. 9 shows anode current and voltage waveforms before the voltage boosting circuitry of the device of FIG. 8.

Consequently, the current is high during the CO oxidizing voltage, but the overall cell output voltage is low (since the overvoltage is high). However, the power, which is defined as the product of voltage times current, is surprisingly high for CO concentrations greater than 1 percent. This enables various voltage conditioning circuits to be used to convert the current or voltage or both to a desired form. In one embodiment of our invention, the output voltage is boosted to a more usable value by using a voltage boosting circuit, such as a switching circuit. These devices typically keep the output energy nearly the same (efficiencies are usually over 80 percent), but increase the voltage while decreasing the current. A schematic of the device, along with typical waveforms of voltage and current before the conditioning circuit is shown in FIGS. 8 and 9. Thus, one embodiment of the invention relates to a fuel cell having a pulsed electrode in combination with a voltage conditioning circuit, such as a voltage booster to change the cell voltage during the oxidation pulse to a desired level. Furthermore, all of the cleaning techniques described in this patent may be used for fuel cells with CO concentrations greater than 1 percent.

Model Based Feedback Control of the Electrode Voltage

When an electrode is pulsed, some loss of voltage due to the pulse is inevitable. This loss is reduced when the fraction of time spent pulsing is minimized or the overvoltage is minimized. Our next modification involves intelligent control of the voltage waveform. This may be done to minimize the magnitude or duration of the pulse, or to satisfy some other system constraint such as avoiding conditions that decrease reliability. Here, we present a method of using a high overvoltage to achieve a low coverage of CO on the anode and then a much smaller overvoltage to maintain a high hydrogen coverage and thus high current from the electrode. Over time, the hydrogen coverage may gradually degrade and the method may be repeated as needed.

The method uses a model based upon the coverage of the electrode surface with hydrogen ($\theta_H$) and CO ($\theta_{co}$). In the following sections, we present several mathematical techniques to (1) clean the surface of CO by raising the overvoltage to minimize the CO coverage and (2) maintain the surface at high hydrogen coverage by maximizing the hydrogen coverage. This two part optimization and control problem can be solved by many techniques. Below we illustrate the techniques of feedback linearization, sliding mode control, and optimal control by a series of examples.

Example 1

Feedback Linearization

The steps are as follows.
1. Develop a model for the fuel cell in question that relates the time derivative of $\theta_H$ and $\theta_{co}$ to the overvoltage. The model involves some unknown coefficients that must be found experimentally. For instance, scientists at Los Alamos National Laboratory have proposed the following model (T. E. Springer, T. Rockward, T. A. Zawodzinski, S. Gottesfeld, Journal of the Electrochemical Society, 148, A11-A23 (2001), which is incorporated by reference). The unknown coefficients are the k's and the b's, and $\eta$ is the overvoltage $$\dot{\theta}_{CO} = k_{fc} P_{CO}(1 - \theta_{CO} - \theta_H) - b_{fc} k_{fc} \theta_{CO} - k_{ec} \theta_{CO} e^{\frac{\eta}{b_c}}$$

$$\dot{\theta}_H = k_{fH} P_H (1 - \theta_{CO} - \theta_H)^2 - b_{fH} k_{fH} \theta_H^2 - 2 k_{eH} \theta_H \sinh\left(\frac{\eta}{b_H}\right)$$

2. Develop a model, called a set of observers that relates $\theta_H$ and $\theta_{co}$ to the measured current of the cell, $j_H$. The observer equations are numerically integrated in real time and will converge to the coverage values, $\theta_H$ and $\theta_{co}$. The parameters $l_1$ and $l_2$ determine the rate of convergence.

$$\dot{\hat{\theta}}_{CO} = k_{fc}P_{CO}(1 - \hat{\theta}_{CO} - \hat{\theta}_H) - b_{fc}k_{fc}\hat{\theta}_{CO} - k_{ec}\hat{\theta}_{CO}e^{\frac{\eta}{b_c}} + l_1(\theta_H - \hat{\theta}_H)$$

$$\dot{\hat{\theta}}_H = k_{fH}P_H(1 - \hat{\theta}_{CO} - \hat{\theta}_H)^2 - b_{fH}k_{fH}\hat{\theta}_H^2 - 2k_{eH}\hat{\theta}_H\sinh\left(\frac{\eta}{b_H}\right) + l_2(\theta_H - \hat{\theta}_H)$$

$$\theta_H = \frac{j_H}{2k_{eH}\sinh\left(\frac{\eta}{b_H}\right)}$$

3. Develop a desired trajectory for the variation of $\theta_{co}$ and $\theta_H$ in time. This trajectory may be chosen to maximize durability of the cell, minimize the expected overvoltage changes, or for some other reason. That is, constraints may be prescribed on any of the variables. In this example, we use a first order trajectory to reach the desired state values $\theta_H^d$ and $\theta_{CO}^d$.

$$\dot{\theta}_H = -\alpha(\theta_H - \theta_H^d)$$

$$\dot{\theta}_{CO} = -\beta(\theta_{CO} - \theta_{CO}^d)$$

4. Equate the time derivative of $\theta_{co}$ in the trajectory (3) to the time derivative of $\theta_{co}$ in the observer model (2). Equate the time derivative of $\theta_H$ in the trajectory (4) to the time derivative of $\theta_H$ in the observer model (2).

$$-\beta\hat{\theta}_{CO} = k_{fc}P_{CO}(1 - \hat{\theta}_{CO} - \hat{\theta}_H) - b_{fc}k_{fc}\hat{\theta}_{CO} - k_{ec}\hat{\theta}_{CO}e^{\frac{\eta}{b_c}}$$

$$-\alpha\hat{\theta}_H = k_{fH}P_H(1 - \hat{\theta}_{CO} - \hat{\theta}_H)^2 - b_{fH}k_{fH}\hat{\theta}_H^2 - 2k_{eH}\hat{\theta}_H\sinh\left(\frac{\eta}{b_H}\right)$$

5. Solve for the overvoltage from the $\theta_{co}$ equation in (5).

$$\eta = \ln\left(\frac{-\beta(\hat{\theta}_{CO} - \hat{\theta}_{CO}^d) - k_{fc}P_{CO}(1 - \hat{\theta}_{CO} - \hat{\theta}_H) + b_{fc}k_{fc}\hat{\theta}_{CO}}{-k_{ec}\hat{\theta}_{CO}}\right)b_C$$

6. Solve for the overvoltage from the $\theta_H$ equation in (5).

$$\eta = \sinh^{-1}\left(\frac{-\alpha(\hat{\theta}_H - \hat{\theta}_H^d) - k_{fH}P_H(1 - \hat{\theta}_{CO} - \hat{\theta}_H)^2 + b_{fH}k_{fH}\hat{\theta}_H^2}{-2k_{eH}\hat{\theta}_H}\right)b_H$$

7. Vary the overvoltage according to 6 to drive $\theta_{co}$ to a desired value.
8. When $\theta_{co}$ reaches the desired value, vary the overvoltage according to 7 to drive $\theta_H$ to a desired value.
9. Repeat when needed.

Figure 10A:
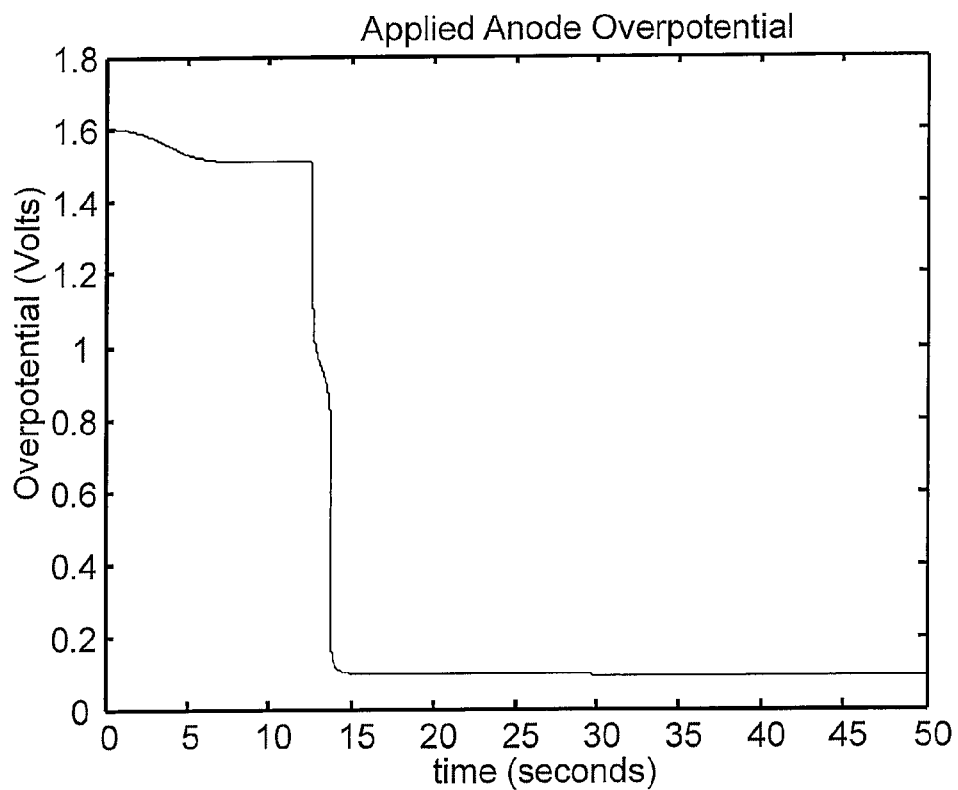
FIG. 10A shows a plot of overpotential in a fuel cell using feedback linearization.
Figure 10B:
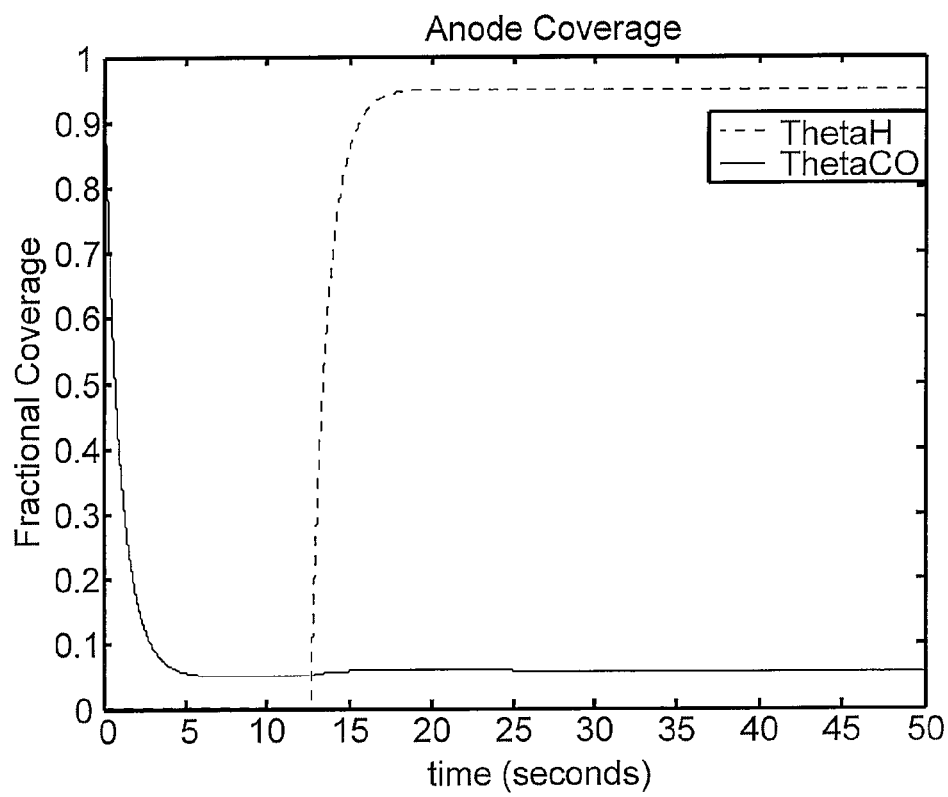
FIG. 10B shows a plot of the coverage of CO in a fuel cell using feedback linearization.

The results of this example algorithm are shown in FIGS. 10A and 10B. FIG. 10A shows the overpotential as a function of time, with the overpotential high for about 13 seconds and low for the remaining time. FIG. 10B shows the coverage of CO being reduced from about 0.88 to 0.05 by applying step 5, followed by the coverage of hydrogen being increased from near zero to 0.95 by applying step 6. The hydrogen coverage will gradually degrade over time and the process will be repeated periodically.

Example 2

Sliding Mode Control

The exact feedback linearization technique presented above may not always be achievable due to the uncertainty of the model parameters (k's and b's). Therefore sliding mode control techniques can be applied to reduce sensitivity to the model parameters. The design procedure is as follows:

1. Develop a model, called a set of observers, that relates $\theta_H$ and $\theta_{co}$ to the measured current of the cell, $j_H$. The observer equations are numerically integrated in real time and will converge to the coverage values, $\theta_H$ and $\theta_{co}$. The parameters $l_1$ and $l_2$ determine the rate of convergence.

$$\dot{\hat{\theta}}_{CO} = k_{fc}P_{CO}(1 - \hat{\theta}_{CO} - \hat{\theta}_H) - b_{fc}k_{fc}\hat{\theta}_{CO} - k_{ec}\hat{\theta}_{CO}e^{\frac{\eta}{b_c}} + l_1(\theta_H - \hat{\theta}_H)$$

$$\dot{\hat{\theta}}_H = k_{fH}P_H(1 - \hat{\theta}_{CO} - \hat{\theta}_H)^2 - b_{fH}k_{fH}\hat{\theta}_H^2 - 2k_{eH}\hat{\theta}_H\sinh\left(\frac{\eta}{b_H}\right) + l_2(\theta_H - \hat{\theta}_H)$$

$$\theta_H = \frac{j_H}{2k_{eH}\sinh\left(\frac{\eta}{b_H}\right)}$$

$$\theta_{CO} = j_{CO}/\{2k_{ec}\exp(\eta/b_C)\}$$

2. Develop a desired trajectory for the variation of $\theta_{co}$ and $\theta_H$ in time. This trajectory may be chosen to maximize durability of the cell, minimize the expected overvoltage changes, or for some other reason. That is constraints may be prescribed on any of the variables. In this example, we use a first order trajectory to reach the desired state values $\theta_H^d$ and $\theta_{CO}^d$.

$$\dot{\theta}_H = -\alpha(\theta_H - \theta_H^d)$$

$$\dot{\theta}_{CO} = -\beta(\theta_{CO} - \theta_{CO}^d)$$

3. Design the CO sliding surface as the CO coverage minus the integral of the desired state trajectory:

$$S_{CO} = \hat{\theta}_{CO} - \int \beta(\hat{\theta}_{CO} - \theta_{CO}^d)$$

4. Design control as $\eta = M*\text{sign}(S_{CO})$, where M is some constant used to enforce sliding mode.
5. After sliding mode exists the equivalent control is defined as:

$$\eta = \ln\left(\frac{-\beta(\hat{\theta}_{CO} - \hat{\theta}_{CO}^d) - k_{fc}P_{CO}(1 - \hat{\theta}_{CO} - \hat{\theta}_H) + b_{fc}k_{fc}\hat{\theta}_{CO}}{-k_{ec}\hat{\theta}_{CO}}\right)b_C$$

6. Design the $H_2$ sliding surface as the $H_2$ coverage minus the integral of the desired state trajectory $$S_H = \hat{\theta}_H - \int \alpha(\hat{\theta}_H - \theta_H^d)$$

7. Design control as $\eta = M*\text{sign}(S_H)$, where M is some constant used to enforce sliding mode.

8. After sliding mode exists the equivalent control is defined as:

$$\eta = \sinh^{-1}\left(\frac{-\alpha(\hat{\theta}_H - \theta_H^d) - k_{fH}P_H(1 - \hat{\theta}_{CO} - \hat{\theta}_H)^2 + b_{fH}k_{fH}\hat{\theta}_H^2}{-2k_{eH}\hat{\theta}_H}\right)b_H$$

9. Vary the overvoltage according to 4 to drive $\theta_{co}$ to a desired value.
10. When $\theta_{co}$ reaches the desired value, vary the overvoltage according to 7 to drive $\theta_H$ to a desired value.
11. Repeat when needed.

Example 3

Optimal Control

Optimal control can also be implemented to minimize the power applied to the cell used to stabilize the hydrogen electrode coverage, hence maximizing the output power of the cell. The steps are as follows:

1. Develop a model, called a set of observers, that relates $\theta_H$ and $\theta_{co}$ to the measured current of the cell, $j_H$. The observer equations are numerically integrated in real time and will converge to the coverage values, $\theta_H$ and $\theta_{co}$. The parameters $l_1$ and $l_2$ determine the rate of convergence.

$$\dot{\hat{\theta}}_{CO} = k_{fc}P_{CO}(1 - \hat{\theta}_{CO} - \hat{\theta}_H) - b_{fc}k_{fc}\hat{\theta}_{CO} - k_{ec}\hat{\theta}_{CO}e^{\frac{\eta}{b_c}} + 1_1(\theta_H - \hat{\theta}_H)$$

$$\dot{\hat{\theta}}_H = k_{fH}P_H(1 - \hat{\theta}_{CO} - \hat{\theta}_H)^2 - b_{fH}k_{fH}\hat{\theta}_H^2 - 2k_{eH}\hat{\theta}_H\sinh\left(\frac{\eta}{b_H}\right) + 1_2(\theta_H - \hat{\theta}_H)$$

$$\theta_H = \frac{j_H}{2k_{eH}\sinh\left(\frac{\eta}{b_H}\right)}$$

2. Develop a cost function used to minimize the power applied to the cell as the CO coverage is driven to the desired value $\theta_{CO}^d$. Where A and B are the weights and $T_1$ is the time interval for the CO control to be applied.

$$\int_0^{T_1}\left(A(\hat{\theta}_{CO} - \theta_{CO}^d)^2 + B\eta^2\right)dt$$

3. Solve for the overvoltage to drive CO to the desired value by applying dynamic programming techniques as described in Kirk, Donald E., Optimal Control Theory, Englewood Cliffs, N.J., Prentice Hall Inc., 1970. Apply the overvoltage for time zero at the lower limit of integration.

4. Develop a cost function used to maximize the power output of the cell as the $H_2$ coverage is driven to the desired value $\theta_H^d$. Where A and B are the weights and $T_2$-$T_1$ is the time interval for the hydrogen control to be applied.

$$\int_{T_1}^{T_2}\left(A(\hat{\theta}_H - \theta_H^d)^2 - B(E_0 - \eta)^2 I^2\right)dt$$

5. Solve for the overvoltage as in step 3. Apply the overvoltage for time $T_i$ to $T_2$.
6. Repeat as necessary.

A Feedback Control Technique Based Upon Natural Oscillations in Fuel Cell Voltage to Clean the Electrode It has been known for some time that some electrodes, when operated as an anode with hydrogen and carbon monoxide, can result in an oscillating current or voltage. In fact this has been known for other competing reactions on electrodes as well. One explanation of this effect is as follows for a system operated at constant current. On an initially clean electrode, the hydrogen reacts and the carbon monoxide begins to poison the surface, resulting in an increasing overvoltage. At a certain overvoltage, the CO is oxidized to $CO_2$ and the poison is removed, decreasing the overvoltage back to nearly the original, clean surface value. Deibert and Williams ("Voltage oscillations of the H2/CO system", J. Electrochemistry Soc., 1969) showed that these voltage oscillations were quite strong at levels of CO of 10,000 ppm or 1 percent. However, the oscillations disappeared when the system was operated at 5 percent CO.

Since 1 percent is the approximate concentration of CO from a reforming reaction in a fuel cell, taking advantage of these natural oscillations to periodically clean the electrode is a powerful advantage, eliminating the need for reducing the CO to the 10-50 ppm now required by fuel cell manufacturers. Furthermore, operation of a fuel cell at CO levels higher than 1 percent and observing the natural oscillations is previously unknown and enables the advantages previously mentioned for high CO level operation.

By using a feedback control system to operate the fuel cell at constant current with levels of CO higher than 1 percent in the fuel, and letting the control system vary the anode voltage to maintain the constant current output, enhanced performance can result.

Figure 11A:
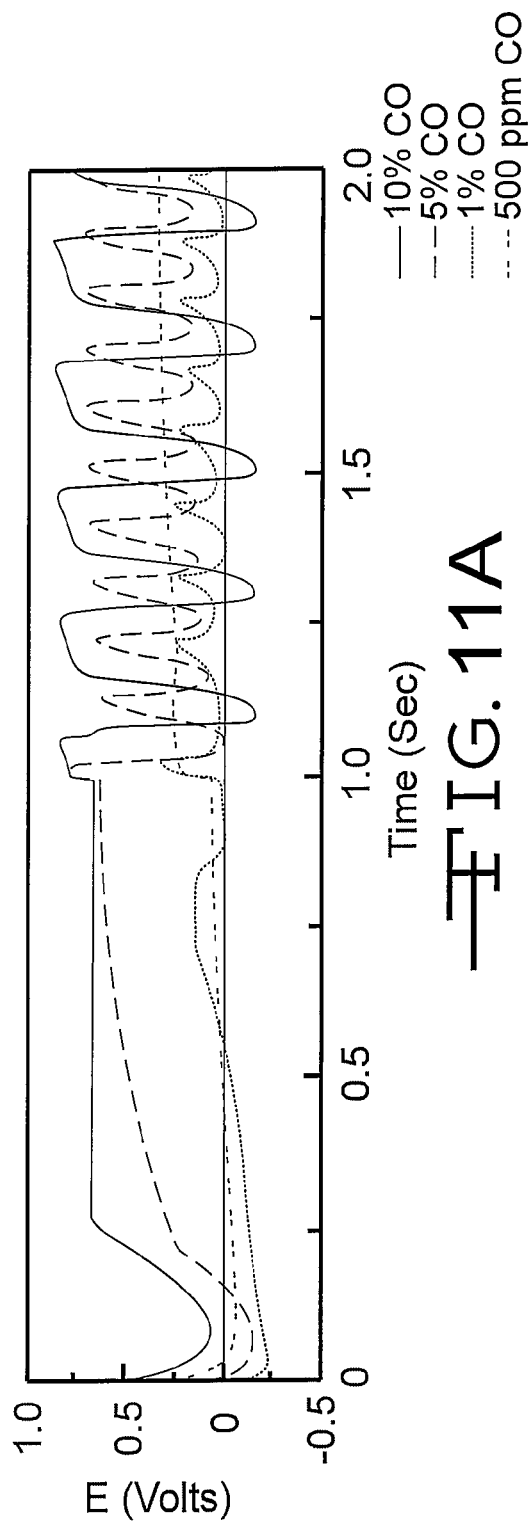
FIG. 11A shows voltage waveforms of a fuel cell using a feedback control technique based on natural oscillations in voltage to clean the electrode.
Figure 11B:
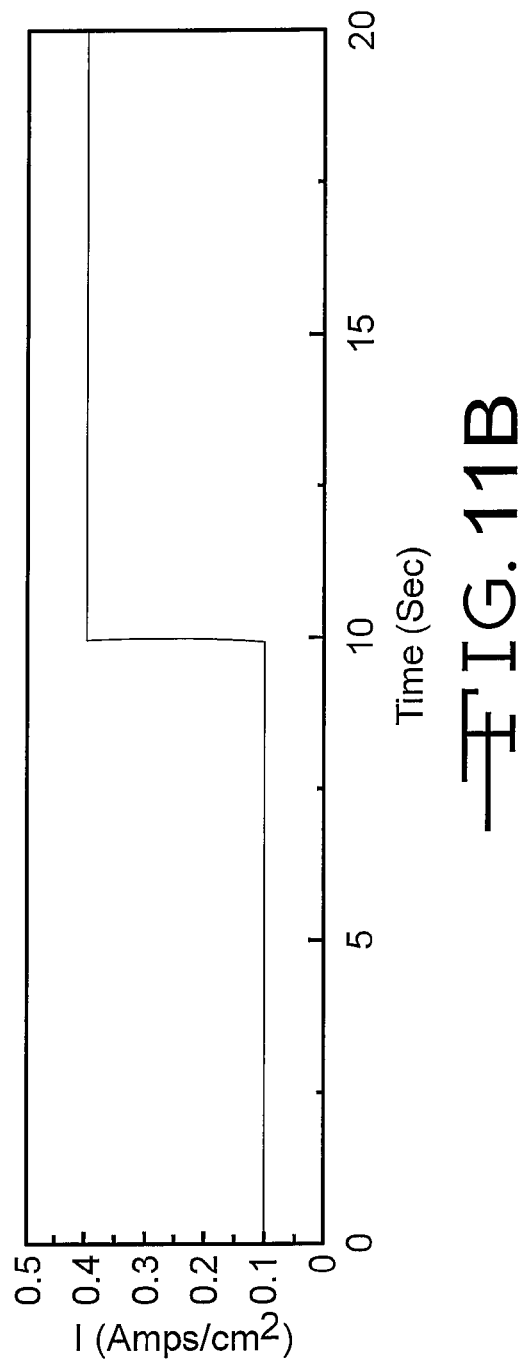
FIG. 11B shows a current waveform of the fuel cell of FIG. 11A.

FIGS. 11A and 11B show data obtained in our laboratory using the same 5 cm2 fuel cell described in the earlier paragraphs. These data were obtained at constant current operation a PAR Model 273 Potientostat operated in the galvanostatic mode. Hydrogen fuel was used with four different levels of CO: 500 ppm CO, 1 percent, 5 percent and 10 percent. The figures show that when the current is increased to 0.4 amps and the concentration of CO is 1 percent or greater, the cell voltage begins to oscillate with an amplitude that is consistent with the amplitudes expected for CO oxidation. Furthermore, the amplitude increases as the CO level in the fuel increases.

In this application, we first describe a method of maintaining a constant current by varying the voltage similar to FIG. 11A. Next we describe using this system to follow a varying current of power.

To accomplish this, a feed back control system is used to measure the current of the fuel cell, compare it to a desired value and adjust the waveform of the anode voltage to achieve that desired value. Essentially, this will reproduce a voltage waveform similar to FIG. 11A.

The controller to be used is any control algorithm or black box method that does not necessarily require a mathematical model or representation of the dynamic system as described in Passino, Kevin M., Stephen Yurkovich, Fuzzy Control, Addison Wesley Longman, Inc., 1998. The control algorithm may be used in accordance with a voltage following or other buffer circuit that can supply enough power to cell to maintain the desired overpotential at the anode. Because the voltage follower provides the power, the controller may be based upon low power electronics. However, in some cases it may be more advantageous to not incorporate the voltage follower in the control circuit, since in some cases external power will not be required to maintain the overvoltage.

The resulting output of the controller will be similar to that in FIGS. 11A and 11B, with the addition of a voltage boosting circuit the cell may be run at some desired constant voltage or follow a prescribed load.

In some cases, the natural oscillations of voltage may be maintained by providing pulses of the proper frequency and duration to the anode or cathode of the device to excite and maintain the oscillations. Since this is a nonlinear system, the frequency may be the same as or different from the frequency of the natural oscillations. The pulsing energy may come from an external power source or from feeding back some of the power produced by the fuel cell. The fed back power can serve as the input to a controller that produces the pulses that are delivered to the electrode.

The present invention is contemplated for use with fuel cells as well as other apparatuses used in electrochemical processes. By way of example and not limitation, the types of fuel cells include PEM fuel cells, direct methanol fuel cells, methane fuel cells, propane fuel cells, solid oxide fuel cells, and phosphoric acid fuel cells.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A feedback control method of operating an electrochemical apparatus operated using a fuel containing an electrochemically active contaminant by applying voltage control to an electrode of the apparatus using the following algorithm the following steps:
   a) determining a mathematical model that relates an instantaneous coverage of the electrode by fuel and contaminant to an overvoltage applied to the anode;
   b) forming an observer that relates the instantaneous coverage of the fuel and contaminant to a single operating parameter of the apparatus;
   c) forming an objective function that describes a performance parameter of the fuel cell for a discrete set of values related to the instantaneous coverage of the electrode by fuel and contaminant;
   d) maximizing the objective function using optimal control techniques to maximize performance of the electrochemical apparatus by determining an optimal waveform of the single operating parameter over a specified period of time;
   e) driving the contaminant coverage of the electrode to a low value by varying only the overvoltage to obtain the optimal waveform of the single operating parameter;
   f) driving the fuel coverage of the electrode to a high value by varying only the overvoltage to obtain the optimal waveform of the single operating parameter; and
   f) repeating steps a) through d) as necessary.

2. The feedback control method according to claim 1 wherein step c) includes prescribing a desired trajectory of the instantaneous coverage of the electrode by fuel and contaminant as a function of time and
   forming a set of mathematical relationships from steps a), b) and the desired trajectory that allows an apparatus current to be measured, the overvoltage to be prescribed for application to the electrode and instantaneous contaminant coverage of the electrode and instantaneous fuel coverage of the electrode to be predicted.

3. A feedback control method of operating a fuel cell by applying voltage control to an electrode of the fuel cell, the method comprising the following steps:
   a) determining a mathematical model that relates an instantaneous coverage of the electrode by hydrogen and carbon monoxide to an overvoltage applied to the anode;
   b) forming an observer that relates the instantaneous coverage of the electrode by hydrogen and carbon monoxide to a single measured operating parameter of the fuel cell;
   c) forming an objective function that describes a performance parameter of the fuel cell for a discrete set of values related to the instantaneous coverage of the electrode by hydrogen and carbon monoxide;
   d) maximizing the objective function using optimal control techniques to maximize performance of the fuel cell by determining an optimal waveform of the single operating parameter over a specified period of time;
   e) driving the carbon monoxide coverage of the electrode to a low value by varying only the overvoltage to obtain the optimal waveform of the single operating parameter;
   f) driving the hydrogen coverage of the electrode to a high value by varying only the overvoltage to obtain the optimal waveform of the single operating parameter; and
   g) repeating steps a) through d) as necessary.

4. The feedback control method according to claim 3 wherein step c) includes
   prescribing a desired trajectory of the instantaneous coverage of the hydrogen and carbon monoxide as a function of time and
   forming a set of mathematical relationships from steps a), b) and the desired trajectory that allows fuel cell current to be measured, the overvoltage to be prescribed and instantaneous carbon monoxide coverage and instantaneous hydrogen coverage to be predicted.

5. The method according to claim 4 wherein:
   in step e), the carbon monoxide coverage is driven to a low value by varying the overvoltage applied to the electrode using optimal control techniques; and
   in step f), the hydrogen coverage is driven to a high value by varying the overvoltage applied to the electrode using optimal control techniques.

6. The feedback control method of claim 3 wherein the single operating parameter is fuel cell current.

7. The feedback control method of claim 3 wherein the single operating parameter is fuel cell voltage.

8. The feedback control method of claim 6 wherein the performance parameter is power delivered by the fuel cell.

9. The feedback control method of claim 6 wherein the performance parameter is an ability to follow a useful load connected to the fuel cell.

10. The feedback control method of claim 8 wherein the electrode is an anode of the fuel cell.

11. The feedback control method of claim 8 wherein the electrode is a cathode of the fuel cell.

12. The feedback control method of claim 6 wherein the optimal control techniques utilized in step d) include dynamic programming.

* * * * *